United States Patent
Miyamoto et al.

(10) Patent No.: US 9,699,378 B2
(45) Date of Patent: Jul. 4, 2017

(54) IMAGE PROCESSING APPARATUS, METHOD, AND STORAGE MEDIUM CAPABLE OF GENERATING WIDE ANGLE IMAGE

(75) Inventors: Naotomo Miyamoto, Tokyo (JP); Kosuke Matsumoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 376 days.

(21) Appl. No.: 13/240,729

(22) Filed: Sep. 22, 2011

(65) Prior Publication Data

US 2012/0081510 A1 Apr. 5, 2012

(30) Foreign Application Priority Data

Sep. 30, 2010 (JP) ................................. 2010-221329

(51) Int. Cl.
*G06K 9/32* (2006.01)
*H04N 7/00* (2011.01)
*G06K 9/36* (2006.01)
*H04N 5/232* (2006.01)
*H04N 1/387* (2006.01)
*G06T 3/40* (2006.01)

(52) U.S. Cl.
CPC ....... *H04N 5/23238* (2013.01); *G06T 3/4038* (2013.01); *H04N 1/3876* (2013.01)

(58) Field of Classification Search
CPC .. H04N 5/23238; H04N 1/3876; G06T 3/403; G06K 2009/2045
See application file for complete search history.

(56) References Cited

U.S. PATENT DOCUMENTS

| | | | | |
|---|---|---|---|---|
| 5,721,624 A | * | 2/1998 | Kumashiro et al. | 358/450 |
| 6,005,987 A | * | 12/1999 | Nakamura et al. | 382/294 |
| 6,128,416 A | * | 10/2000 | Oura | H04N 1/3876 |
| | | | | 348/239 |

(Continued)

FOREIGN PATENT DOCUMENTS

| | | |
|---|---|---|
| CN | 101739674 A | 6/2010 |
| CN | 101751659 A | 6/2010 |
| JP | 11-282100 A | 10/1999 |

OTHER PUBLICATIONS

Chinese Office Action dated Nov. 21, 2013 (and English translation thereof) in counterpart Chinese Application No. 201110303864.7.

(Continued)

*Primary Examiner* — Joseph Ustaris
*Assistant Examiner* — Rebecca Volentine
(74) *Attorney, Agent, or Firm* — Holtz, Holtz & Volek PC

(57) ABSTRACT

A digital camera 1 includes an image composition unit 52 and a composite position determining unit 53. The image composition unit 52 acquires a plurality of images which have been captured continuously. The composite position determining unit 53 sets candidate areas for determining composite positions in adjacent images, from the plurality of images acquired by the composite position determining unit 52. Furthermore, the composite position determining unit 53 determines composite positions of the adjacent images based on a degree of similarity between the set candidate areas. The image composition unit 52 combines the adjacent images at the determined composite positions.

10 Claims, 7 Drawing Sheets

(56) References Cited

U.S. PATENT DOCUMENTS

| | | | |
|---|---|---|---|
| 6,393,162 B1* | 5/2002 | Higurashi | 382/284 |
| 6,798,923 B1* | 9/2004 | Hsieh et al. | 382/284 |
| 7,095,905 B1* | 8/2006 | Peterson | 382/284 |
| 8,275,215 B2* | 9/2012 | Mei | G06T 11/60 |
| | | | 345/629 |
| 8,385,689 B2* | 2/2013 | Chandrashekar et al. | 382/294 |
| 2002/0163530 A1* | 11/2002 | Takakura | G06T 3/4038 |
| | | | 345/629 |
| 2005/0063608 A1* | 3/2005 | Clarke et al. | 382/284 |
| 2005/0099494 A1* | 5/2005 | Deng et al. | 348/36 |
| 2005/0206743 A1* | 9/2005 | Sim et al. | 348/218.1 |
| 2006/0018547 A1* | 1/2006 | Ouchi | 382/190 |
| 2006/0120625 A1* | 6/2006 | Peleg et al. | 382/284 |
| 2007/0147812 A1* | 6/2007 | Nenonen et al. | 396/20 |
| 2008/0118183 A1* | 5/2008 | Teo | 382/293 |
| 2009/0208062 A1* | 8/2009 | Sorek et al. | 382/107 |
| 2010/0066846 A1* | 3/2010 | Sarwari | H04N 5/232 |
| | | | 348/218.1 |
| 2011/0058014 A1* | 3/2011 | Yamashita et al. | 348/36 |
| 2011/0069148 A1* | 3/2011 | Jones et al. | 348/36 |
| 2011/0141227 A1* | 6/2011 | Bigioi et al. | 348/36 |
| 2011/0141229 A1* | 6/2011 | Stec et al. | 348/37 |
| 2012/0105578 A1* | 5/2012 | Ohmiya | H04N 5/23238 |
| | | | 348/36 |

OTHER PUBLICATIONS

Chinese Office Action dated Jul. 10, 2014 issued in counterpart Chinese Application No. 201110303864.7.

* cited by examiner

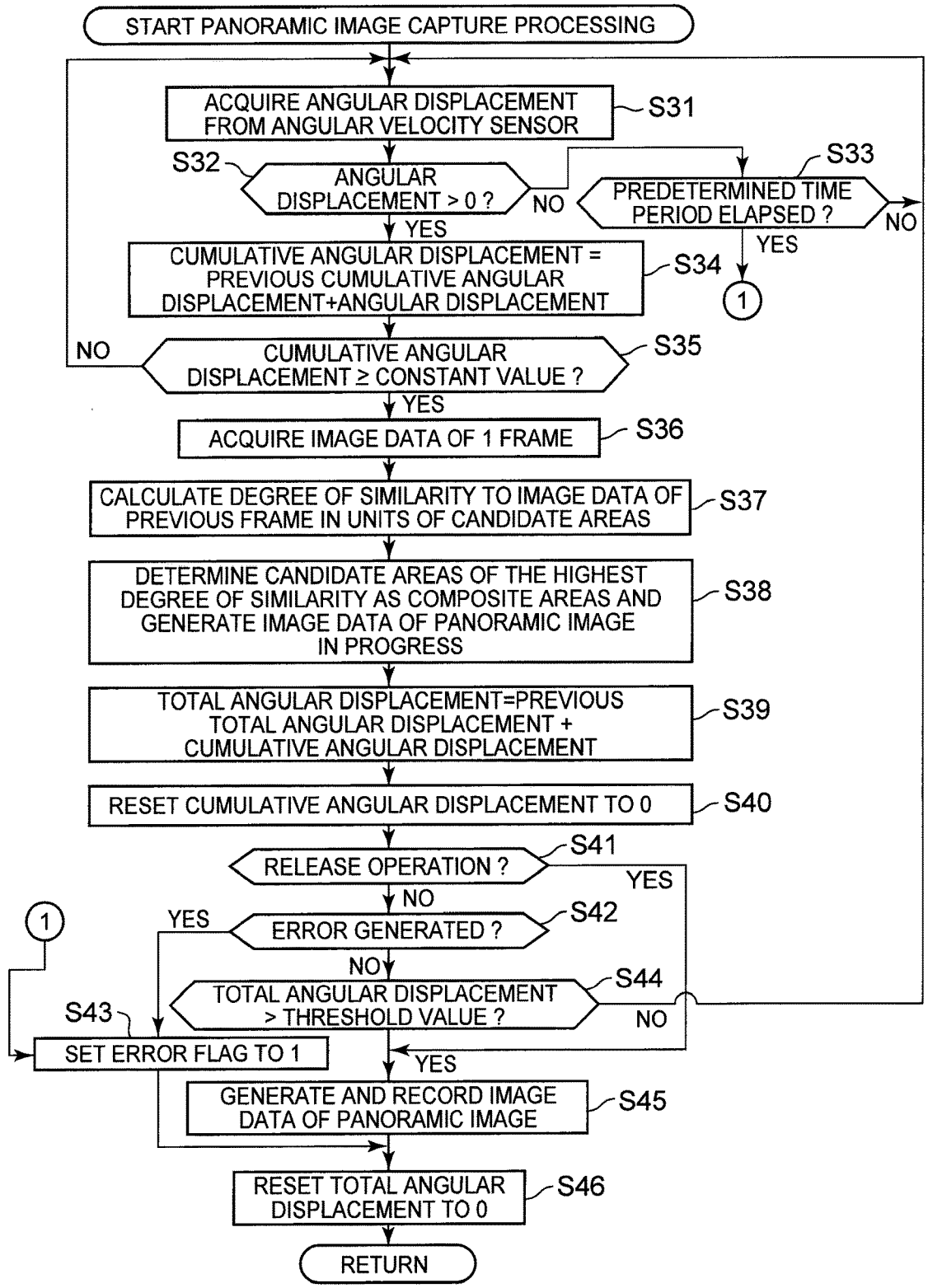

IMAGE PROCESSING APPARATUS, METHOD, AND STORAGE MEDIUM CAPABLE OF GENERATING WIDE ANGLE IMAGE

This application is based upon and claims the benefit of priority from the prior Japanese Patent Application No. 2010-221329, filed Sep. 30, 2010, and the entire contents of which are incorporated herein by reference.

BACKGROUND OF THE INVENTION

Field of the Invention

The present invention relates to an image processing apparatus, method, and storage medium, and more particularly to an image processing apparatus, method, and storage medium capable of generating a wide angle image.

Related Art

With regard to digital cameras, cell phones having an image capturing function, and the like, the angle of view for image capturing depends on the hardware specification of the device main body, such as the focal length of the lens, the size of the image sensor, and the like.

Japanese Patent Application Publication No. 1999-282100 discloses a technique such that a plurality of images are continuously captured while moving an image capturing apparatus in a predetermined direction and are combined to generate a wide angle image, in a case of capturing a wide angle image, such as a panoramic image that is beyond the hardware specification.

Japanese Patent Application Publication No. 1999-282100 discloses a technique that detects a characteristic point of a captured image at each time of a plurality of times of image capture processing, horizontally combines image data of a plurality of captured images so that the characteristic points of two adjacent captured images match each other, and thereby generates image data of a panoramic image.

SUMMARY OF THE INVENTION

It is an object of the present invention to generate a natural wide angle image.

In order to attain the object of the present invention, in accordance with a first aspect of the present invention, there is provided an image processing apparatus, comprising:

an acquiring unit that acquires a plurality of images which have been captured continuously;

a setting unit that sets candidate areas for determining composite positions in adjacent images, from the plurality of images acquired by the acquiring unit;

a composite position determining unit that determines composite positions of the adjacent images based on a degree of similarity between the candidate areas set by the setting unit; and a composite image generating unit that combines the adjacent images at the composite positions determined by the composite position determining unit.

In order to attain the object of the present invention, in accordance with a second aspect of the present invention, there is provided an image processing method of an image processing apparatus having an acquiring unit that acquires a plurality of images which have been captured continuously; the method comprising the steps of:

a setting step of setting candidate areas for determining composite positions in adjacent images, from the plurality of images acquired by the acquiring unit;

a composite position determining step of determining composite positions of the adjacent images based on a degree of similarity between the candidate areas set in the setting step; and a composite image generating step of combining the adjacent images at the composite positions determined by the composite position determining step.

In order to attain the object of the present invention, in accordance with a third aspect of the present invention, there is provided a storage medium readable by a computer that controls an image processing apparatus having an acquiring unit that acquires a plurality of images which have been captured continuously, the storage medium having stored therein a program causing the computer to function as:

a setting unit that sets candidate areas for determining composite positions in adjacent images, from the plurality of images acquired by the acquiring unit;

a composite position determining unit that determines composite positions of the adjacent images based on a degree of similarity between the candidate areas set by the setting unit; and a composite image generating unit that combines the adjacent images at the composite positions determined by the composite position determining unit.

BRIEF DESCRIPTION OF THE DRAWINGS

FIG. 7 is a flowchart showing a detailed flow of panoramic image capture processing from the image capture processing of FIG. 6.

DETAILED DESCRIPTION OF THE INVENTION

The following describes an embodiment of the present invention with reference to the drawings.

Figure 1:
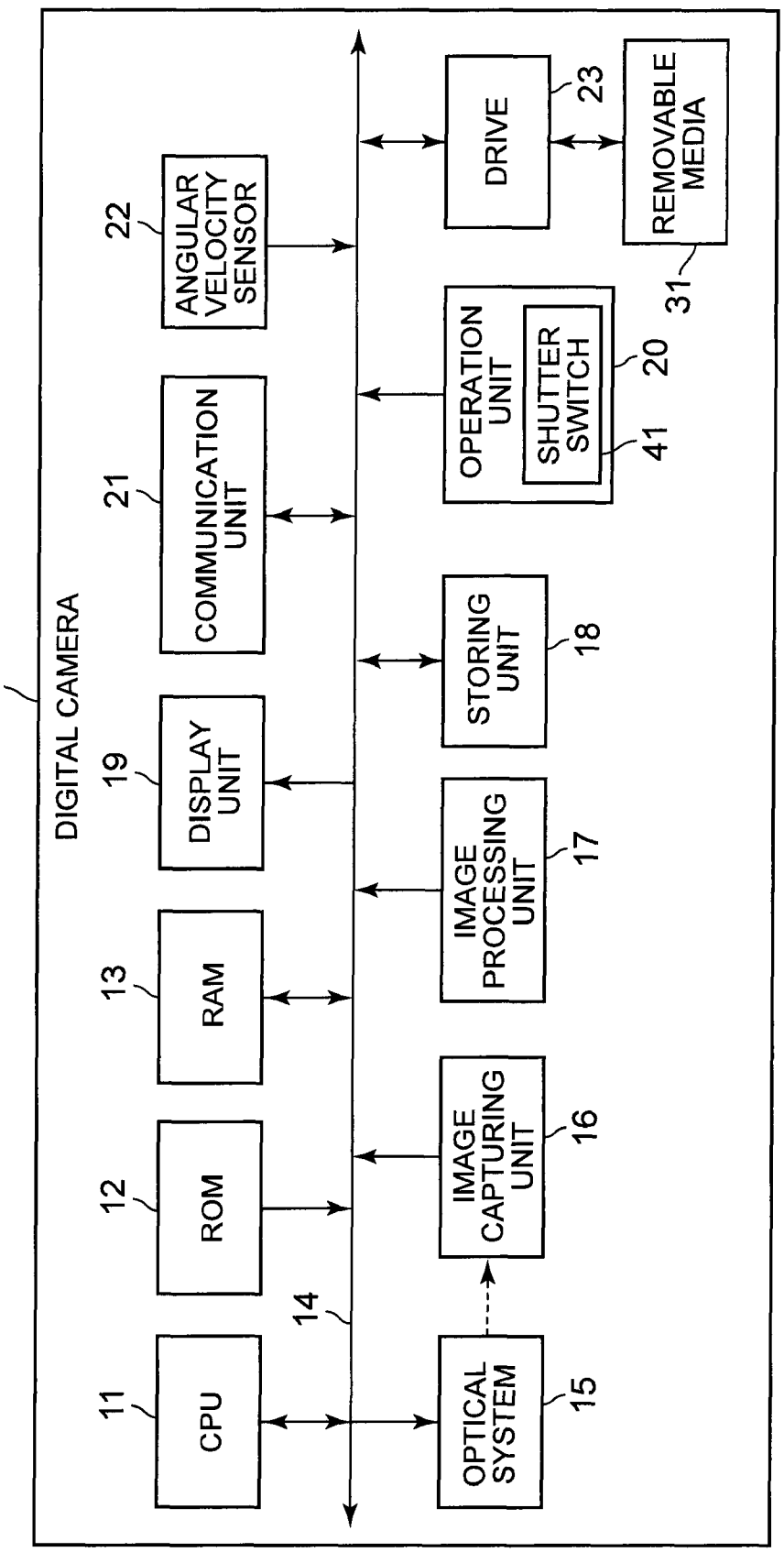
FIG. 1 is a block diagram showing a hardware configuration of a digital camera as one embodiment of an image processing apparatus according to the present invention.

FIG. 1 is a block diagram showing a hardware configuration of the digital camera 1 as one embodiment of the image processing apparatus according to the present invention.

The digital camera 1 is provided with a CPU (Central Processing Unit) 11, a ROM (Read Only Memory) 12, a RAM (Random Access Memory) 13, a bus 14, an optical system 15, an image capturing unit 16, an image processing unit 17, a storing unit 18, a display unit 19, an operation unit 20, a communication unit 21, an angular velocity sensor 22, and a drive 23.

The CPU 11 executes various processes according to programs that are stored in the ROM 12 or programs that are loaded from the storing unit 18 to the RAM 13.

The RAM 12 also stores data and the like, necessary for the CPU 11 to execute the various processes, as appropriate.

For example, according to the present embodiment, programs for implementing functions of an image capture control unit 51, an image composition unit 52, and a composite position determining unit 53 shown in FIG. 2, which will be described later, are stored in the ROM 12 or the storing unit 18. Therefore, each of the functions of the image capture control unit 51, the image composition unit 52, and the composite position determining unit 53 shown in FIG. 2, which will be described later, can be realized by the CPU 11 executing processes according to these programs.

Incidentally, it is possible to transfer at least a part of each function of the image capture control unit 51, the image composition unit 52, and the composite position determining unit 53 shown in FIG. 2, which will be described later, to the image processing unit 17.

The CPU 11, the ROM 12, and the RAM 13 are connected to one another via the bus 14. The bus 14 is also connected with the optical system 15, the image capturing unit 16, the image processing unit 17, the storing unit 18, the display unit 19, the operation unit 20, the communication unit 21, the angular velocity sensor 22, and the drive 23.

The optical system 15 is configured by a light condensing lens such as a focus lens, a zoom lens, and the like, for example, to photograph a subject. The focus lens is a lens for forming an image of a subject on the light receiving surface of the image sensor of the image capturing unit 16. The zoom lens is a lens for freely changing a focal point within a predetermined range. The optical system 15 also includes a peripheral device to adjust focus, exposure, and the like, as necessary.

The image capturing unit 16 is configured by an optoelectronic conversion device, an AFE (Analog Front End), and the like. The optoelectronic conversion device is configured by a CCD (Charge Coupled Device) type or a CMOS (Complementary Metal Oxide Semiconductor) type optoelectronic conversion device, for example. The optoelectronic conversion device optoelectronically converts (i.e., captures), at a predetermined interval, a light signal of an image of a subject, which has been incident and accumulated during the interval, and sequentially supplies the resultant analog signal to the AFE.

The AFE executes various kinds of signal processing such as A/D (Analog/Digital) conversion on the analog signal and outputs the resultant digital signal as an output signal from the image capturing unit 16.

Hereinafter, the output signal from the image capturing unit 16 is referred to as "image data of a captured image". Thus, image data of a captured image is outputted from the image capturing unit 16 and provided as appropriate to the image processing unit 17 and the like.

The image processing unit 17 is configured by a DSP (Digital Signal Processor), a VRAM (Video Random Access Memory), and the like.

The image processing unit 17 collaborates with the CPU 11 to execute image processing such as noise reduction, white balance, and anti-shaking on image data of a captured image inputted from the image capturing unit 16.

Hereinafter, unless otherwise noted, image data of each captured image inputted from the image capturing unit 16 at a predetermined interval or a processing result thereof is referred to as "image data of a frame", and each captured image expressed by the "image data of a frame" is referred to as "frame". In the present embodiment, such image data of a frame is employed as a unit of processing.

The storing unit 18 is configured by a DRAM (Dynamic Random Access Memory) or the like, and temporarily stores image data of a frame outputted from the image processing unit 17, image data of a panoramic image in progress, which will be described later, and the like. Also, the storing unit 18 stores various kinds of data necessary for various kinds of image processing.

The display unit 19 is configured as a flat display panel, formed, for example, from an LCD (Liquid Crystal Device), an LCD driving unit, and the like. The display unit 19 displays an image represented by image data provided from the storing unit 18 or the like, e.g., a live-view image that will be described later, as a frame unit.

The operation unit 20 includes a plurality of switches, as well as a shutter switch 41, such as a power switch, an image capture mode switch, and a playback switch, which are not illustrated. When one of the plurality of switches is pressed and operated, the operation unit 20 provides to the CPU 11 an instruction assigned to the switch.

The communication unit 21 controls communication with other devices (not shown) via a network including the Internet.

The angular velocity sensor 22 includes a gyro or the like, detects a value of angular displacement of the digital camera 1, and provides to the CPU 11 the digital signal (hereinafter, referred to simply as "angular displacement") indicative of the detection result. Here, the angular velocity sensor 22 is assumed to implement a function of an orientation sensor, as necessary.

Removable media 31 such as a magnetic disk, an optical disk, a magneto-optical disk, or a semiconductor memory is mounted to the drive 23 as appropriate. Also, programs read from the removable media 31 are installed in the storing unit 18 as necessary. Furthermore, similar to the storing unit 18, the removable media 31 can store various kinds of data such as image data and the like, stored in the storing unit 18.

Figure 2:
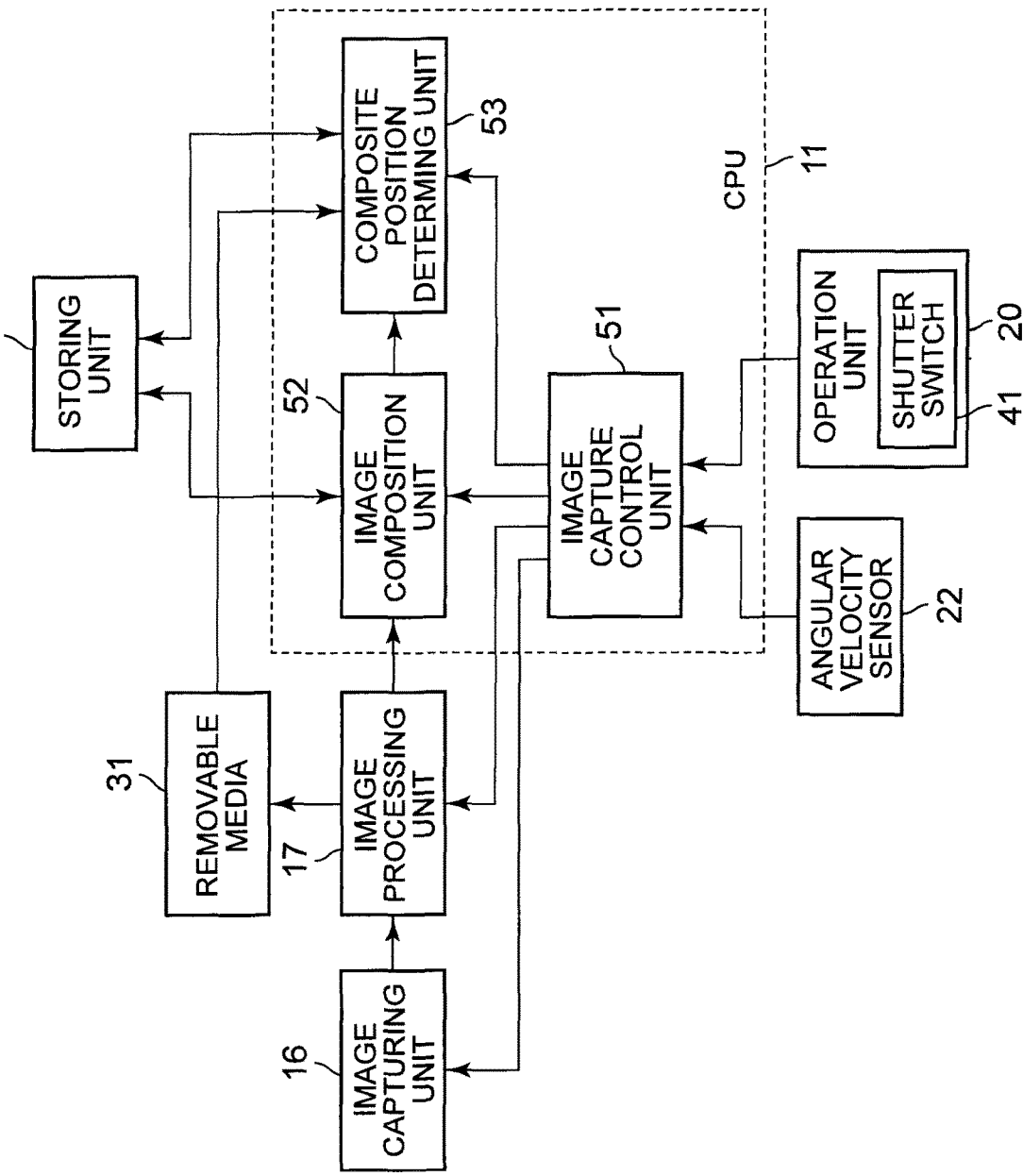
FIG. 2 is a functional block diagram showing a functional configuration for the digital camera shown in FIG. 1 to carry out image capture processing.

FIG. 2 is a functional block diagram showing a functional configuration to carry out a series of processing (hereinafter, referred to as "image capture processing") by the digital camera 1 shown in FIG. 1, from capturing an image of a subject up to storing captured image data of the subject in the removable media 31.

As shown in FIG. 2, the CPU 11 is provided with an image capture control unit 51, an image composition unit 52, and a composite position determining unit 53.

It is to be noted that, as described above, the functions of the image capture control unit 51, the image composition unit 52, and the composite position determining unit 53 need not necessarily be installed in the CPU 11 as in the present embodiment, and it is possible to transfer at least a part thereof to the image processing unit 17.

The image capture control unit 51 controls the overall execution of the image capture processing. For example, the image capture control unit 51 can selectively switch an operation mode of the digital camera 1 between a normal image capture mode and a panoramic image capture mode and can execute processing according to the operation mode to which switching has been made.

In the panoramic image capture mode, the image composition unit 52 and the composite position determining unit 53 operate under the control of the image capture control unit 51.

In the following, for ease of understanding of the image capture control unit 51, the image composition unit 52, and the composite position determining unit 53, before describing the functional configurations thereof, a detailed description will be given concerning the panoramic image capture mode with reference to FIGS. 3 and 4 as appropriate.

Figure 3A:
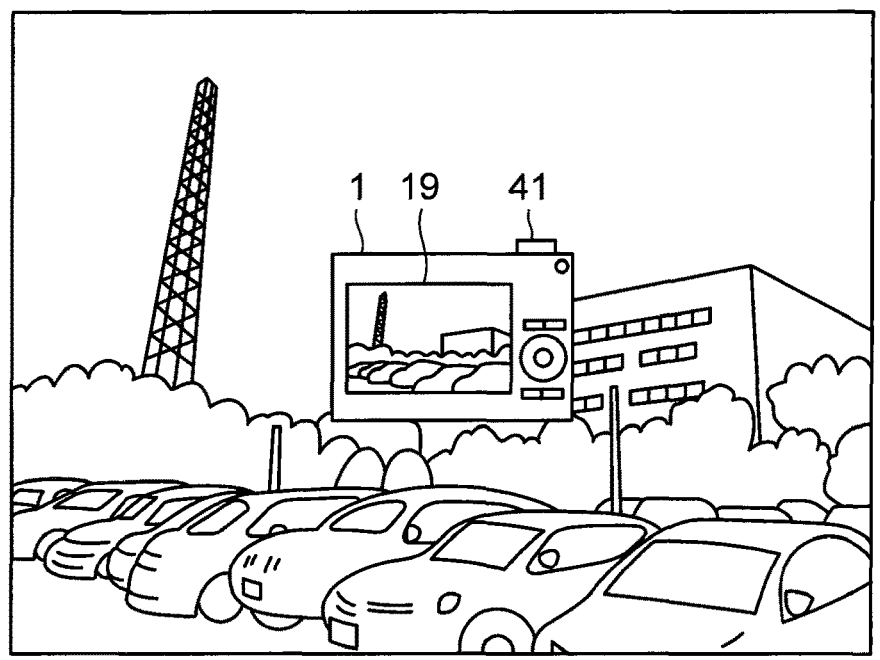
FIGS. 3A and 3B are diagrams respectively illustrating image capture operations in cases in which a normal image capture mode and a panoramic image capture mode are respectively selected as an operation mode of the digital camera shown in FIG. 2.
Figure 3B:
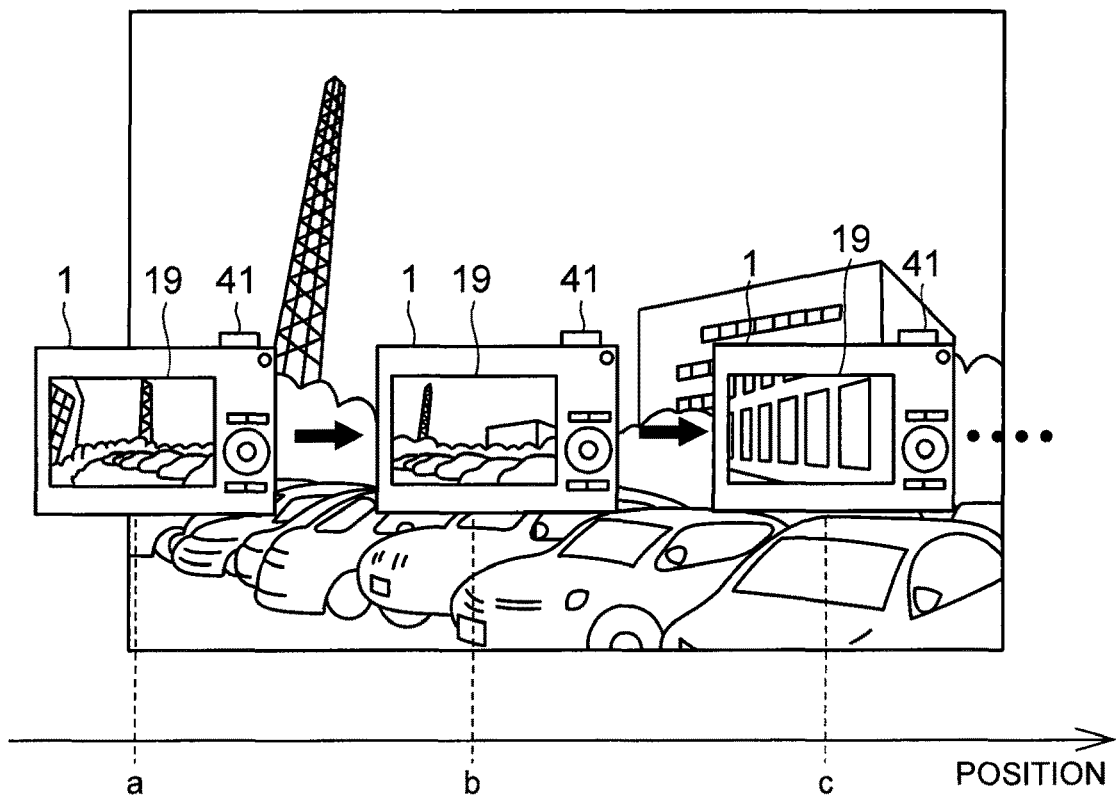

FIGS. 3A and 3B are diagrams respectively illustrating image capture operations in cases in which a normal image capture mode and a panoramic image capture mode are respectively selected as an operation mode of the digital camera 1 shown in FIG. 2.

More specifically, FIG. 3A is a diagram illustrating the image capture operation in the normal image capture mode. FIG. 3B is a diagram illustrating the image capture operation in the panoramic image capture mode.

In each of FIGS. 3A and 3B, the picture in the back of the digital camera 1 shows a real world view including a subject of the digital camera 1. The vertical dotted lines shown in FIG. 3B indicate positions a, b, and c in the moving direction of the digital camera 1. Here, the moving direction of the digital camera 1 is intended to mean a direction in which an optical axis of the digital camera 1 moves when the user pivots about his/her own body to change the shooting direction (angle) of the digital camera 1.

The normal image capture mode is intended to mean an operation mode in which an image of a size (resolution) corresponding to the angle of view of the digital camera 1 is captured.

In the normal image capture mode, as shown in FIG. 3A, the user presses the shutter switch 41 of the operation unit 20 all the way down while holding the digital camera 1. Hereinafter, such an operation of pressing the shutter switch 41 all the way down is referred to as "full press operation" or simply "full press".

The image capture control unit 51 controls execution of a series of processes up to a process of storing in the removable media 31, as a recording target, image data of a frame outputted from the image processing unit 17 immediately after the user's full press operation.

Hereinafter, such a series of processes carried out under control of the image capture control unit 51 in the normal image capture mode is referred to as "normal image capture processing".

On the other hand, the panoramic image capture mode is intended to mean an operation mode in which a panoramic image is captured.

In the panoramic image capture mode, as shown in FIG. 3B, the user moves the digital camera 1 in a direction of black arrows shown therein, while continuing the full press operation of the shutter switch 41.

While the full press operation is continued, the image capture control unit 51 controls the image composition unit 52 and the like to repeat temporarily storing in the storing unit 18, image data of a frame outputted from the image processing unit 17 immediately after each time an angular displacement cumulatively provided from the angular velocity sensor 22 reaches a constant value.

After that, the user gives an instruction for termination of the panoramic image capturing by an operation of releasing the full press operation (hereinafter, referred to as "release operation"), i.e., moving a finger or the like, away from the shutter switch 41.

When instructed to terminate the panoramic image capturing, the image capture control unit 51 generates image data of a panoramic image by horizontally combining the image data of the plurality of frames thus far stored in the storing unit 18 in the stored order.

The image capture control unit 51 then controls the image composition unit 52 and the like to store the image data of the panoramic image in the removable media 31 as a recording target.

Thus, in the panoramic image capture mode, the image capture control unit 51 controls the image composition unit 52 and the like and controls a series of processing, from generating image data of a panoramic image up to storing it in the removable media 31 as a recording target.

Hereinafter, such a series of processing in the panoramic image capture mode carried out under control of the image capture control unit 51 is referred to as "panoramic image capture processing".

More specifically, under control of the image capture control unit 51, the image composition unit 52 carries out processing as follows:

Each time the digital camera 1 moves by a constant amount (each time the cumulative value of the angular displacement thereof reaches a constant value), the image composition unit 52 receives an acquisition instruction issued from the image capture control unit 51, and acquires image data of one frame from the image processing unit 17. The image composition unit 52 horizontally combines the image data of the plurality of frames thus far acquired in the acquired order, and thereby generates image data of a panoramic image.

Figure 4:
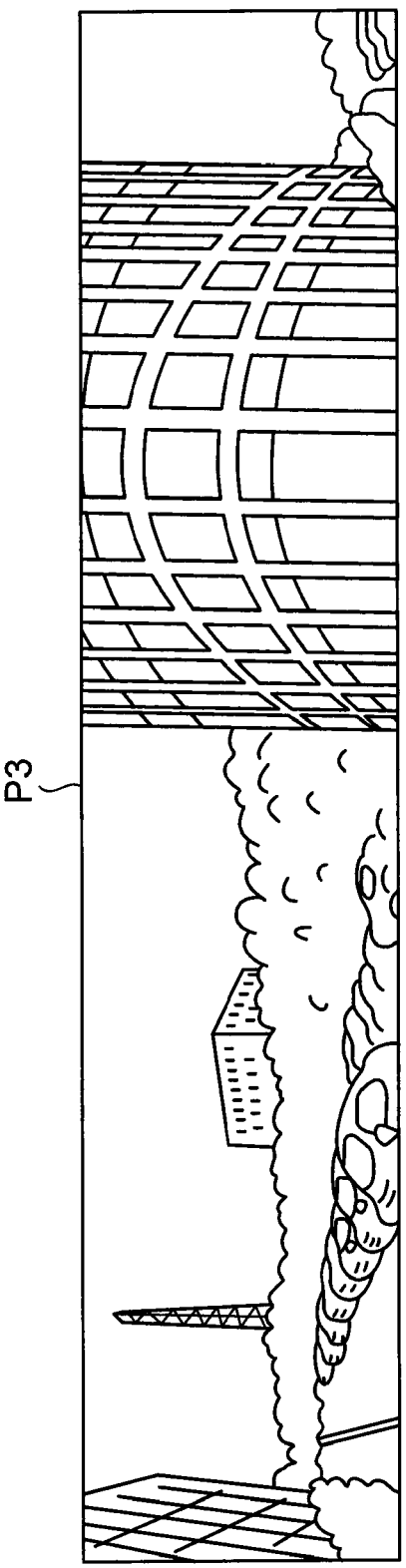
FIG. 4 is a diagram showing one example of panoramic image generated in the panoramic image capture mode shown in FIG. 3B.

FIG. 4 shows one example of a panoramic image generated by the image composition unit 52 in the panoramic image capture mode shown in FIG. 3.

In the panoramic image capture mode, when an image capture operation as shown in FIG. 3B is performed, under control of the image capture control unit 51, image data of a panoramic image P3 shown in FIG. 4 is generated by the image composition unit 52, and stored in the removable media 31.

The composite position determining unit 53 determines a composite position in a unit of a candidate area for the image data of each of the plurality of frames to be combined by the image composition unit 52.

Here, the candidate area is intended to mean a set of pixels constituting a line or a rectangle from among constituent pixels of the image data of a frame. Hereinafter, the direction of the line or the longitudinal direction of the rectangle is referred to as "length direction", the length of the line or the rectangle in the length direction is referred to as "line length", the direction orthogonal to the length direction is referred to as "width direction", and the length of the line or the rectangle in the width direction is referred to as "line width".

Here, the line is intended to mean a set of pixels having one pixel in the width direction and L (L being an integer larger than one) pixels in the length direction. Assuming that the unit for line length and line width is pixel, a line is a set of pixels whose line length is L and whose line width is 1. On the other hand, a rectangle is a set of pixels whose line length is L and whose line width is W (W being an integer larger than one and smaller than L). In short, if W indicating the line width can include 1, what is referred to as a "line" is a set of pixels such that the line length is L and the line width is W.

Although the length direction of a candidate area is not limited and can be arbitrary, it is preferable that the length direction be a direction perpendicular to the direction in which the plurality of frames are combined. It is because, in that case, the length direction of a candidate area coincides with the direction of the boundary line of adjacent frames to be combined. In the present embodiment, since the plurality of frames are combined in a horizontal (landscape) direction, the length direction of a candidate area is assumed to be vertical. Hereinafter, as far as the present embodiment is concerned and unless otherwise noted, it is assumed that the candidate area means a candidate area in a vertical direction.

FIG. 5 is a diagram illustrating a method of determining a composite position by the composite position determining unit 53.

In FIG. 5, the frame Fa indicates a frame captured at the K-th (K being an integer larger than one) time of capturing during panoramic image capturing. The frame Fb indicates a frame captured at the (K+1)th time of capturing during the same panoramic image capturing. That is, the frame Fb is acquired immediately after the frame Fa has been acquired.

Figure 5A:
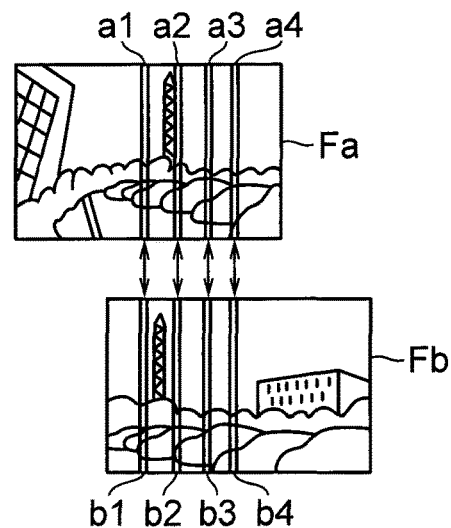
FIGS. 5A, 5B, and 5C are diagrams respectively illustrating a method of determining composite positions when combining images for the purpose of generating image data of a panoramic image.

As shown in FIG. 5A, the composite position determining unit 53 detects overlapping areas (area portions including the same subject) within the frames Fa and Fb, and specifies the overlapping areas as search ranges.

Here, the method of detecting the overlapping areas (area portions including the same subject) within the frames Fa and Fb is not limited, and an arbitrary method can be employed such as one that compares the image data of frames Fa and Fb by way of image processing.

However, in the present embodiment, as described above, the image data of one frame is captured each time the digital camera 1 has moved a constant amount (each time the cumulative value of the angular displacement reaches a constant value). Therefore, it is possible to estimate the overlapping areas to some extent based on the constant amount (the constant value of angular displacement). Therefore, in the present embodiment, a method is employed such that the overlapping areas are detected as the area portions estimated based on the constant amount (the constant value of angular displacement).

Next, the composite position determining unit 53 defines as references, for example, the left ends of the respective overlapping areas of the frames Fa and Fb, specified as search ranges, and calculates a degree of similarity between candidate areas of the frames Fa and Fb rightward from the reference, one after another. The candidate areas of the frames Fa and Fb whose degree of similarity is to be calculated are equidistantly spaced from the reference.

The positions and number of candidate areas whose degree of similarity is to be calculated, are not limited. However, for ease of description, it is herein assumed that four candidate areas have been selected at predetermined equally-spaced intervals.

In FIG. 5A, four candidate areas a1 to a4 are selected from the frame Fa, and four candidate areas b1 to b4 are selected from the frame Fb. The similarities are calculated respectively between the candidate areas a1 and b1, between the candidate areas a2 and b2, between the candidate areas a3 and b3, and between the candidate areas a4 and b4.

Although there is no particular limitation to the method of calculating a degree of similarity, in the present embodiment, a method is employed that calculates a degree of similarity using the sum of squared differences, i.e., SSD (Sum of Squared Differences), in luminance between respective pixels of two candidate areas to be compared.

Figure 5B:
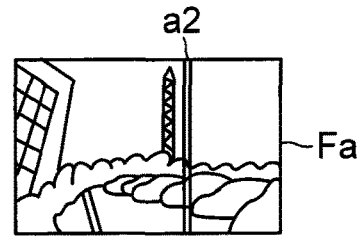

Here, as shown in FIG. 5B, it is assumed that the highest degree of similarity (the least SSD) has been calculated between the candidate areas a2 and b2, for example.

Figure 5C:
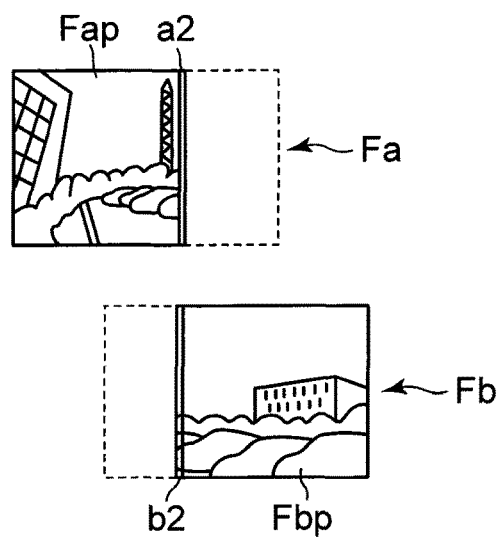

In this case, as shown in FIG. 5C, the image data of a partial area Fap of the frame Fa and the image data of a partial area Fbp of the frame Fb are combined so that the candidate area a2 of the frame Fa and the candidate area b2 of the frame Fb are stuck together as respective edges of the partial areas.

This means that the candidate area a2 becomes an optimal composite area for the frame Fa, and the candidate area b2 becomes an optimal composite area for the frame Fb.

In the above, a description has been given of the functional configuration of the digital camera 1 according to the present invention with reference to FIGS. 2 to 5.

In the following, a description will be given of the image capture processing carried out by the digital camera 1 having such a functional configuration with reference to FIG. 6.

Figure 6:
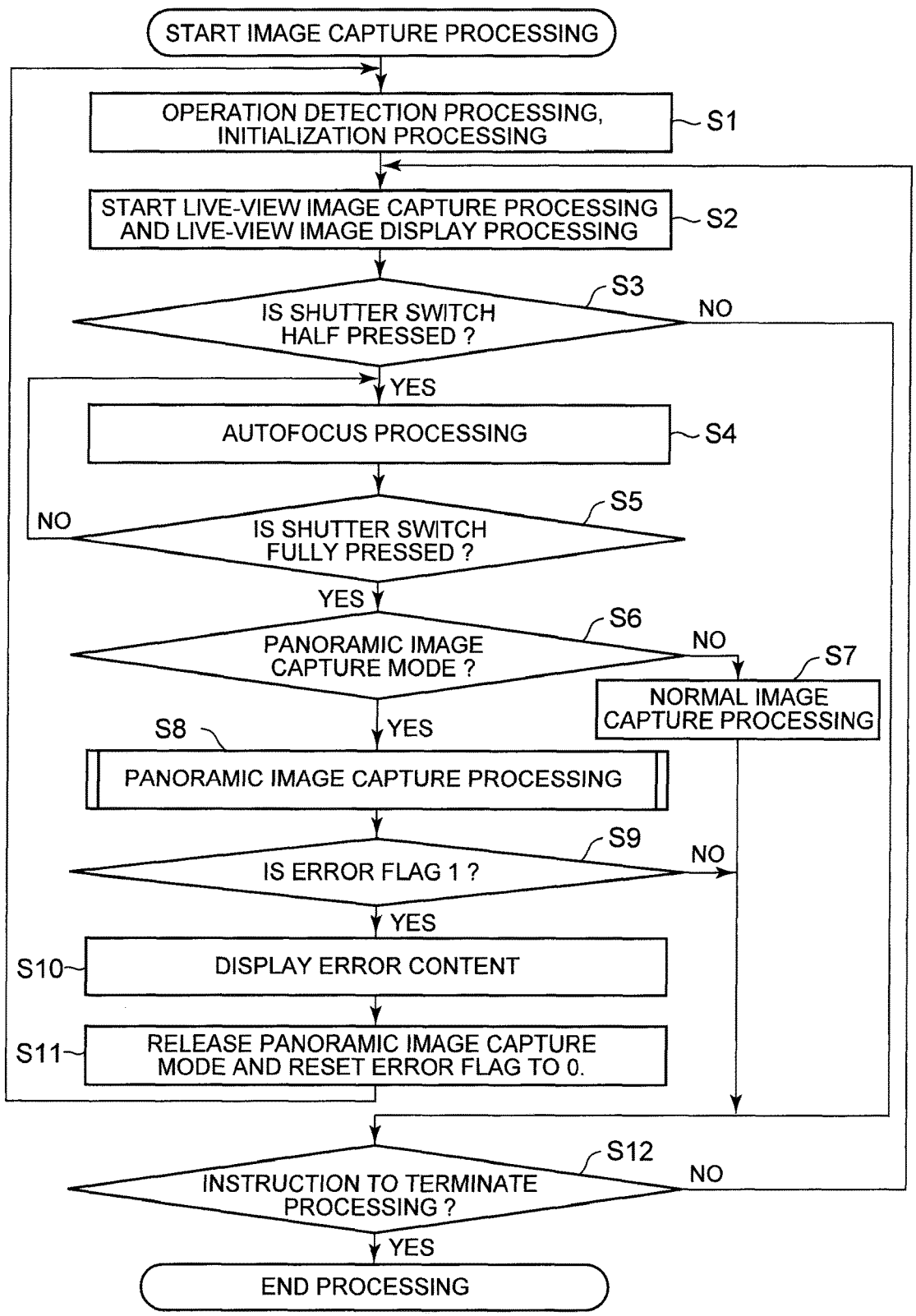
FIG. 6 is a flowchart showing one example of flow of image capture processing carried out by the digital camera shown in FIG. 2.

FIG. 6 is a flowchart showing one example of flow of the image capture processing.

In the present embodiment, the image capture processing starts when the power supply (not shown) of the digital camera 1 is turned on.

In step S1, the image capture control unit 51 shown in FIG. 2 executes operation detection processing and initialization processing.

The operation detection processing is intended to mean a process of detecting the states of switches of the operation unit 20. By executing the operation detection processing, the image capture control unit 51 can detect whether the normal image capture mode or the panoramic image capture mode is specified as the operation mode.

The initialization processing, in the present embodiment, includes a process of setting a constant value of the angular displacement and a threshold value (e.g., 360 degrees) as an upper limit of the angular displacement.

More specifically, the constant value of the angular displacement and the threshold value (e.g., 360 degrees) as an upper limit of the angular displacement are stored in advance in the ROM 12 shown in FIG. 1, and those values are set after being read from the ROM 12 and written into the RAM 13. The constant value of the angular displacement is used in the determination process of step S35 of FIG. 7, which will be described later. On the other hand, the threshold value (e.g., 360 degrees) as an upper limit of the angular displacement is used in the determination process of step S44 of FIG. 7.

Furthermore, in the present embodiment, the angular displacement detected by the angular velocity sensor 22 is accumulated, for example, as shown in steps S34 and S39 of FIG. 7, which will be described later. As a result of accumulation thereof, a cumulative angular displacement and a total angular displacement are stored in the RAM 13. The difference between the cumulative angular displacement and the total angular displacement will be described later. Therefore, processes of resetting the cumulative angular displacement and the total angular displacement to 0 are included in the initialization processing in the present embodiment. The cumulative angular displacement is compared with the above-described constant value in the determination process of step S35 of FIG. 7, which will be described later. On the other hand, the total angular displacement is compared with the above-described threshold value in the determination process of step S44 of FIG. 7, which will be described later.

Furthermore, the initialization processing in the present embodiment includes a process of resetting an error flag to 0. The error flag is intended to mean a flag that is set to 1 when an error has occurred during the panoramic image capture processing (see step S43 of FIG. 7, which will be described later).

In step S2, the image capture control unit 51 starts live-view image capture processing and live-view image display processing.

This means that the image capture control unit 51 controls the image capturing unit 16 and the image processing unit 17 to continue the image capturing by the image capturing unit 16. While the image capturing is continued by the image capturing unit 16, the image capture control unit 51 temporarily stores in a memory (the storing unit 18, in the present embodiment) image data of frames sequentially outputted from the image processing unit 17 via the image capturing unit 16. Such a series of control processing by the image capture control unit 51 is what is referred to as "live-view image capture processing".

Also, the image capture control unit 51 controls a display control unit (not shown) to sequentially read the image data of each frame temporarily stored in the memory (the storing unit 18, in the present embodiment) at the time of the live-view image capturing and to cause the display unit 19 to sequentially display each frame corresponding to the image data. Such a series of control processing by the image capture control unit 51 is what is referred to as "live-view image display processing". Hereinafter, a frame that is displayed on the display unit 19 by the live-view image display processing is referred to as "live-view image".

In step S3, the image capture control unit 51 determines whether or not the shutter switch 41 is half pressed.

Here, "half press" is intended to mean an operation of pressing the shutter switch 41 of the operation unit 20 half way down (as far as a predetermined position but short of its lower limit). Hereinafter, such an operation is also referred to as "half press operation" as appropriate.

If the shutter switch 41 is not half pressed, a determination of NO is made in step S3, and control proceeds to step S12.

In step S12, the image capture control unit 51 determines whether or not an instruction has been given to terminate the processing.

In the present embodiment, it is assumed that, with regard to the instruction to terminate the processing, notification is used which indicates that the power supply (not shown) of the digital camera 1 has been turned off, but there is no particular limitation thereto.

Therefore, in the present embodiment, when the image capture control unit 51 is notified that the power supply has been turned off, a determination of YES is made in step S12, and the entire image capture processing ends.

On the other hand, when the power supply is on, since the image capture control unit 51 is not notified that the power supply has been turned off, a determination of NO is made in step S12, control goes back to step S2, and the processes thereafter are repeated. This means that, in the present embodiment, as long as the power is on, the loop processing from steps S3: NO, to S12: NO, is repeated until the shutter switch 41 is half pressed, and the image capture processing enters into a waiting state.

When the shutter switch 41 is half pressed during the live-view image display processing, a determination of YES is made in step S3, and control proceeds to step S4.

In step S4, the image capture control unit 51 controls the image capturing unit 16 to execute what is called AF (Auto Focus) processing.

In step S5, the image capture control unit 51 determines whether or not the shutter switch 41 has been full pressed.

If the shutter switch 41 has not been full pressed, a determination of NO is made in step S5. In such a case, control goes back to step S4, and the processes thereafter are repeated. This means that, in the present embodiment, the loop processing of step S4 and step S5: NO, is repeated until the shutter switch 41 is full pressed, and the AF processing is executed each time the loop processing is repeated.

After that, when the shutter switch 41 is full pressed, a determination of YES is made in step S5, and control proceeds to step S6.

In step S6, the image capture control unit 51 determines whether or not the operation mode currently set is the panoramic image capture mode.

If the operation mode is not the panoramic image capture mode, i.e., the normal image capture mode is currently set, a determination of NO is made in step S6, and control proceeds to step S7.

In step S7, the image capture control unit 51 executes the above-described normal image capture processing.

This means that image data of one frame outputted from the image processing unit 17 immediately after the full press operation is stored in the removable media 31, as a recording target. With this, the normal image capture processing of step S7 ends, and control proceeds to step S12. Since the processes of steps S12 and thereafter have been already described above, a description thereof is omitted here.

On the other hand, if the panoramic image capture mode is currently set, a determination of YES is made in step S6, and control proceeds to step S8.

In step S8, the image capture control unit 51 executes the panoramic image capture processing described above.

A detailed description of the panoramic image capture processing will be given later with reference to FIG. 7, but basically, image data of a panoramic image is generated and stored in the removable media 31 as a recording target. With this, the panoramic image capture processing of step S8 ends, and control proceeds to step S9.

In step S9, the image capture control unit 51 determines whether or not the error flag is set to 1.

A detailed description will be given later with reference to FIG. 7, but if the image data of the panoramic image is stored in the removable media 31 as a recording target and thereby the panoramic image capture processing of step S8 ends properly, the error flag is set to 0. In such a case, a determination of NO is made in step S9, and control proceeds to step S12. Since the processes of steps S12 and thereafter have been already described above, a description thereof is omitted here.

On the other hand, if some error has occurred during the panoramic image capture processing of step S8, the panoramic image capture processing ends improperly. In such a case, since the error flag is set to 1, a determination of YES is made in step S9, and control proceeds to step S10.

In step S10, the image capture control unit 51 displays the error content on the display unit 19. Specific examples of the error content to be displayed will be described later.

In step S11, the image capture control unit 51 releases the panoramic image capture mode and resets the error flag to 0.

After that, control goes back to step S1, and processes thereafter are repeated. This means that the image capture control unit 51 waits for another image capture operation by the user.

In the above, a description has been given of flow of the image capture processing with reference to FIG. 6.

In the following, a description will be given of a detailed flow of the panoramic image capture processing of step S8 from the image capture processing of FIG. 6 with reference to FIG. 7.

FIG. 7 is a flowchart showing a detailed flow of the panoramic image capture processing.

As described above, when the shutter switch 41 is fully pressed in the panoramic image capture mode, determinations of YES are made in steps S5 and S6 of FIG. 6, control proceeds to step S8, and the following processing is executed as the panoramic image capture processing.

This means that, in step S31 of FIG. 7, the image capture control unit 51 acquires angular displacement from the angular velocity sensor 22.

In step S32, the image capture control unit 51 determines whether or not the angular displacement acquired in the process of step S31 is greater than 0.

If the user has not moved the digital camera 1, the angular displacement is equal to 0. Therefore, a determination of NO is made in step S32, and control proceeds to step S33.

In step S33, the image capture control unit 51 determines whether or not a predetermined time period for which the angular displacement continues to be 0 has elapsed. As the predetermined time period, for example, a time period can be employed that is appropriately longer than a time period necessary for the user to start to move the digital camera 1 after the full press of the shutter switch 41.

If the predetermined time period has not yet elapsed, a determination of NO is made in step S33, control goes back to step S31, and the processes thereafter are repeated. This means that, as long as the duration of a state in which the user does not move the digital camera 1 does not exceed the predetermined time period, the image capture control unit 51 repeats the loop processing from steps S31 to S33: NO, and thereby the panoramic image capture processing enters into a waiting state.

During such a waiting state, if the user moves the digital camera 1, the angular displacement acquired from the angular velocity sensor 22 becomes greater than 0. In such a case, a determination of YES is made in step S32, and control proceeds to step S34.

In step S34, the image capture control unit 51 updates the cumulative angular displacement by adding the angular displacement acquired in the process of step S31 to the previous cumulative angular displacement (cumulative angular displacement=previous cumulative angular displacement+angular displacement). In this way, the value stored in the RAM 13 as the cumulative angular displacement is updated.

The cumulative angular displacement is intended to mean an accumulated value of the angular displacement and indicates the moving amount of the digital camera 1.

Here, in the present embodiment, each time the user moves the digital camera 1 by a constant amount, it is assumed that image data of one frame (target to be combined) for generation of image data of a panoramic image in progress, which will be described later, is supplied from the image processing unit 17 to the image composition unit 52.

For this purpose, a cumulative angular displacement corresponding to the "constant amount" as a moving amount of the digital camera 1 has been given in advance as the "constant value" in the initialization processing of step S1 of FIG. 6.

In the present embodiment, each time the cumulative angular displacement reaches the constant value, image data of one frame (target to be combined) is supplied from the image processing unit 17 to the image composition unit 52, and the cumulative angular displacement is reset to 0.

Such a series of processing is carried out as processes of a subsequent step S35 and thereafter.

In step S35, the image capture control unit 51 determines whether or not the cumulative angular displacement has reached the constant value.

If the cumulative angular displacement has not yet reached the constant value, a determination of NO is made in step S35, control goes back to step S31, and processes thereafter are repeated. This means that, unless the cumulative angular displacement reaches the constant value due to the fact that the user has moved the digital camera 1 by the constant amount, the image capture control unit 51 repeats the loop processing from steps S31 to S35.

After that, when the cumulative angular displacement has reached the constant value due to the fact that the user has moved the digital camera 1 by the constant amount, a determination of YES is made in step S35, and control proceeds to step S36.

In step S36, the image composition unit 52 acquires image data of one frame from the image processing unit 17 under control of the image capture control unit 51.

This means that, after control proceeds to step S36 due to the fact that the cumulative angular displacement has reached the constant value, the image capture control unit 51 issues an acquisition instruction to the image composition unit 52.

Upon receiving the acquisition instruction, the image composition unit 52 acquires image data of one frame from the image processing unit 17, as the process of step S36.

In step S37, the composite position determining unit 53 calculates a degree of similarity between the image data of the frame acquired in the process of step S36 and the image data of the previously acquired frame in units of candidate areas.

In the above-mentioned example of FIG. 5, the frame currently acquired in the process of step S36 corresponds to the frame Fb, and the frame previously acquired therein corresponds to the frame Fa. The degree of similarity between each of the candidate areas b1 to b4 of the frame Fb and each of the candidate areas a1 to a4 of the frame Fa is calculated.

In step S38, the image composition unit 52 defines as composite areas a pair of candidate areas of the highest degree of similarity from among the pairs of candidate areas, the degree of similarity between which is calculated in the process of step S37, and thereby generates data of a panoramic image in progress.

Here, the panoramic image in progress is intended to mean an image showing an area captured up to now from among the panoramic image to be generated when a full press operation is performed in a state in which the panoramic image capture mode is selected.

When the process of step S38 is executed for the K-th (K being an integer larger than 1) time, the image data of the K-th frame has been already acquired in the K-th process of the preceding step S36. Therefore, the K-th (current) panoramic image in progress is an image composed by sticking together partial areas of respective first to (k−1)th frames (i.e., a panoramic image in progress at the (k−1)th time) and the K-th frame with respective right and left composite areas, the former corresponding to the candidate area a2 in the example of FIG. 5, and the latter corresponding to the candidate area b2 in the example of FIG. 5.

In step S39, the image capture control unit 51 updates the total angular displacement by adding the current cumulative angular displacement, which is approximately equal to the constant value, to the previous total angular displacement (total angular displacement=previous total angular displacement+cumulative angular displacement). In this way, the value stored in the RAM 13 as the total angular displacement is updated.

In step S40, the image capture control unit 51 resets the cumulative angular displacement to 0. This means that the value stored in the RAM 13 as the cumulative angular displacement is updated to 0.

In this way, the cumulative angular displacement is used for controlling the timing of the image data of one frame (target to be combined) being supplied from the image processing unit 17 to the image composition unit 52, i.e., the timing of issuing the acquisition instruction. For this purpose, the cumulative angular displacement is reset to 0 each time the constant value is reached and the acquisition instruction is issued.

Accordingly, even if the cumulative angular displacement is used, the image capture control unit 51 cannot recognize up to which position the digital camera 1 has moved from the panoramic image capture processing starting up until the present.

In order to make it possible for the image capture control unit 51 to recognize up to which position the digital camera 1 has moved, in the present embodiment, the total angular displacement is employed in addition to the cumulative angular displacement.

The total angular displacement is an accumulated value of the angular displacement, but is not reset to 0 even if the cumulative angular displacement has reached the constant value, and is always accumulated until the panoramic image capture processing ends (more precisely, until the process of step S46, which will be described later, is executed).

After the total angular displacement is updated in the process of step S39 and the cumulative angular displacement is reset to 0 in the process of step S40, control proceeds to step S41.

In step S41, the image capture control unit 51 determines whether or not a release operation has been performed.

If no release operation has been performed, i.e., if the shutter switch 41 is still fully pressed by the user, a determination of NO is made in step S41, and control proceeds to step S42.

In step S42, the image capture control unit 51 determines whether or not any error has occurred in image capturing.

While there is no particular limitation with regard to error in image capturing, in the present embodiment, as an error in image capturing, any movement of the digital camera 1 in an oblique, upward, downward, or reverse direction by more than a predetermined value is employed.

If no error in image capturing has occurred, a determination of NO is made in step S42, and control proceeds to step S44.

In step S44, the image capture control unit 51 determines whether or not the total angular displacement has exceeded the threshold value.

As described above, the total angular displacement is intended to mean an accumulated value of angular displacement from the point in time when the panoramic image capture processing starts (when full press operation has been performed) until the point in time when the process of step S44 is executed.

In the present embodiment, the maximum possible amount by which the user can move the digital camera 1 during the panoramic image capturing is predetermined. The total angular displacement corresponding to the "maximum moving amount" as a moving amount of the digital camera 1 is given in advance as the "threshold value" in the initialization processing of step S1 of FIG. 6.

This means that, in the present embodiment, the fact that the total angular displacement has reached the threshold value means that the digital camera 1 has moved by the maximum moving amount.

Therefore, if the total angular displacement has not reached the threshold value, i.e., the moving amount of the digital camera 1 has not reached the maximum moving amount, the user can still continue to move the digital camera 1. In this case, a determination of NO is made in step S44, control goes back to step S31, and processes thereafter are repeated.

Assuming that a state in which the time period for which the angular displacement continues to be zero reaches a predetermined time period (i.e., the digital camera 1 does not move for a predetermined time period) is included as one error in image capturing, as long as the full press operation continues in a state in which no error has occurred, the loop processing from steps S31 to S44: NO is repeated.

After that, if a release operation is performed in a state in which no error has occurred (i.e., YES is determined in the process of step S41) or if the digital camera 1 has moved by more than the maximum moving amount (i.e., YES is determined in the process of step S44), then control proceeds to step S45.

In step S45, the image capture control unit 51 generates image data of a panoramic image by the image composition unit 52, and stores it in the removable media 31 as the image data to be recorded.

In the present embodiment, since image data of a panoramic image in progress is generated each time image data of a frame is acquired, the image data of the panoramic image in progress that has been generated at the time of the process of step S45 is employed as the eventual image data of the panoramic image.

In step S46, the image capture control unit 51 resets the total angular displacement to 0.

With this, the panoramic image capture processing ends properly. This means that the process of step S8 of FIG. 6 ends properly, and a determination of NO is made in the process of the next step S9. Since the processes after NO is determined in the process of step S9 have been already described above, a description thereof is omitted here.

During the series of processes described above, if some error occurs, i.e., if YES is determined in the process of step S33, or if YES is determined in the process of step S42, then control proceeds to step S43.

In step S43, the image capture control unit 51 sets the error flag to 1.

In this case, the process of step S45 is not executed, i.e., no image data of any panoramic image is recorded, and the panoramic image capture processing ends improperly.

This means that the process of step S8 of FIG. 6 ends improperly, YES is determined in the process of the next step S9, and error content is displayed in the process of step S10.

What is displayed as error content in this case is not limited as described above, and, for example, a message such as "Image capture failure" or "Time is over" may be displayed.

As described above, the digital camera 1 of the present embodiment is provided with an image capturing unit 16, which sequentially outputs data of each image sequentially acquired by capturing an image at a predetermined time interval, as image data of a frame.

The digital camera 1 of the present embodiment is also provided with an image composition unit 52 and a composite position determining unit 53.

The image composition unit 52 acquires image data of a frame outputted from the image capturing unit 16 by the image processing unit 17 each time the digital camera 1 moves by a constant amount (each time the above-described cumulative angular displacement reaches a constant value) and stores it in the storing unit 18. Furthermore, the image composition unit 52 combines at least a part of image data of a plurality of frames that have been cumulatively stored in the storing unit 18, and thereby sequentially generates image data of a panoramic image in progress (composite image).

The composite position determining unit 53 calculates a degree of similarity for a plurality of pairs of candidate areas between paired candidate areas within respective partial areas of two adjacent frames, from among the targets to be combined by the image composition unit 52, and determines the composite positions of the two adjacent frames based on the pair of candidate areas of the highest degree of similarity.

In this way, as described with reference to FIG. 5, parts of a plurality of frames are combined at proper positions. This will prevent image data of frames from being combined into image date of a composite image in which the same subject is observed in double, or a subject supposed to be present is missing in the vicinity of the composite position of two frames. As a result, it is possible to acquire image data of a panoramic image that will not feel strange.

It should be noted that the present invention is not limited to the embodiment described above, and modifications and improvements thereto within a scope in which an object of the present invention can be realized, are included in the invention.

For example, it has been described in the embodiment described above that when a composite position is determined by the composite position determining unit 53, candidate areas of the same length as the number of pixels in a vertical direction of a frame have been employed, and a degree of similarity has been determined between the entire candidate areas.

However, it is not necessary to compare the entire candidate areas, and a degree of similarity may be determined between parts of respective candidate areas.

Furthermore, for example, in the embodiment described above, with regard to the candidate areas to be used by the composite position determining unit 53 to determine the composite positions, length, width, positions, and number thereof have been fixed.

However, at least a part of the length, width, positions, and number of candidate areas may be made variable. This means that the composite position determining unit 53 may be provided with a function of variably setting at least a part of the length, width, positions, and number of candidate areas, the degree of similarity between which is to be calculated.

Furthermore, although a description was given in the embodiment described above that the angular displacement of the digital camera 1 is detected by way of the angular velocity sensor 22, the method of detecting the angular displacement is not limited to this.

For example, a method may be employed such that the angular displacement of the digital camera 1 is detected by way of image processing by analyzing the live-view image.

Furthermore, although a description was given in the embodiment described above that the forms of the panoramic image in progress and the panoramic image are landscape-oriented, the present invention is not limited to this. The forms of the panoramic image in progress and the panoramic image may be portrait-oriented, i.e., elongated in a direction in which the digital camera 1 is moved. Also, the image generated by the image composition unit 52 is not limited to a panoramic image, and the image composition unit 52 may generate any kind of a wide angle image by combining a plurality of frames, as long as the wide angle image thus generated has a wider angle of view than that of one of the frames.

Furthermore, a description was given in the embodiment described above that the image processing apparatus according to the present invention is configured by a digital camera.

However, the present invention is not limited to this and can be applied to any electronic device provided with a function capable of generating a panoramic image. For example, the present invention can be applied to a portable personal computer, a portable navigation device, a portable game device, and the like.

The series of processing described above can be executed by hardware and also can be executed by software.

In a case in which the series of processing is to be executed by software, a program configuring the software is installed from a network or a storage medium into an image processing apparatus or a computer that controls the image processing apparatus. The computer may be a computer embedded in dedicated hardware. Alternatively, the computer may be a computer capable of executing various functions by installing various programs, i.e., a general-purpose personal computer, for example.

The storage medium containing the program can be configured not only by the removable media 31 distributed separately from the device main body for supplying the program to a user, but also by a storage medium or the like supplied to the user in a state incorporated in the device main body in advance. The removable media 31 is composed of a magnetic disk (including a floppy disk), an optical disk, a magnetic optical disk, or the like, for example. The storage medium supplied to the user in the state incorporated in the device main body in advance includes the ROM 12 storing the program, a hard disk included in the storing unit 18, and the like, for example.

It should be noted that, in the present description, the step describing the program stored in the storage medium includes not only the processing executed in a time series following this order, but also includes processing executed in parallel or individually, which is not necessarily executed in a time series.

What is claimed is:

1. An image processing apparatus including a central processing unit (CPU) which is operable to function as units comprising:
an acquiring unit that acquires a plurality of images which have been captured continuously;
a common area setting unit that sets a first common area in a first image from among the plurality of images acquired by the acquiring unit, and sets a second common area in a second image from among the plurality of images acquired by the acquiring unit, wherein the first and second common areas include imaging contents common to both of the first and second images;
a line setting unit that sets a plurality of first lines in the first common area and sets a plurality of second lines in the second common area, the lines being set in the first and second areas regardless of imaging contents of the first and second common areas;
a calculation unit that calculates a similarity by comparing (i) one of the plurality of first lines set in the first common area and (ii) one of the plurality of second lines set in the second common area that corresponds to the one of the plurality of first lines, for each of the plurality of first lines set in the first common area;

a selection unit that selects a pair of lines from among the lines set in the first and second common areas by the line setting unit, based on the similarity calculated by the calculation unit; and a composite unit that combines the first image and the second image such that the pair of lines selected by the selection unit are combined, wherein:

the plurality of first lines set in the first common area and the plurality of second lines set in the second common area are straight lines which extend parallel to each other in a direction perpendicular to a direction in which the first and second images are to be combined, all of the lines set in the first and second common areas having a same predetermined shape and area, and the plurality of first lines are set side by side in the first common area at a fixed distance apart from one another, and the plurality of second lines are set side by side in the second common area at a fixed distance apart from one another.

2. The image processing apparatus as set forth in claim 1, wherein the common area setting unit sets at least one of a length, a width, and a position of each of the first and second common areas.

3. The image processing apparatus as set forth in claim 1, further comprising an image capturing unit, wherein the acquiring unit acquires the plurality of images, each having a first angle of view, by sequentially performing image capturing by the image capturing unit at predetermined time intervals.

4. The image processing apparatus as set forth in claim 1, wherein the first and second common areas are sets of pixels.

5. The image processing apparatus as set forth in claim 1, wherein the selection unit selects the pair of lines having a highest similarity from among the lines set in the first and second common areas.

6. The image processing apparatus as set forth in claim 1, wherein the CPU is operable to further function as units comprising:

a composite image generating unit that generates a panoramic image based on the first and second images combined by the composite unit; and a recording control unit that performs control to record the panoramic image in a recording medium.

7. The image processing apparatus as set forth in claim 1, further comprising a detecting unit that detects the first and second common areas.

8. The image processing apparatus as set forth in claim 1, wherein:

each of the plurality of first lines set in the first common area extends from a first end of the first common area to a second end of the first common area, and each of the lines set in the second common area extends from a first end of the second common area to a second end of the second common area.

9. An image processing method of an image processing apparatus having an acquiring unit that acquires a plurality of images which have been captured continuously, the method comprising:

setting a first common area in a first image from among the plurality of images acquired by the acquiring unit, and setting a second common area in a second image from among the plurality of images acquired by the acquiring unit, wherein the first and second common areas include imaging contents common to both of the first and second images;

setting a plurality of first lines in the first common area and setting a plurality of second lines in the second common area, the lines being set in the first and second areas regardless of imaging contents of the first and second common areas;

calculating a similarity by comparing (i) one of the plurality of first lines set in the first common area and (ii) one of the plurality of second lines set in the second common area that corresponds to the one of the plurality of first lines, for each of the plurality of first lines set in the first common area;

selecting a pair of lines from among the lines set in the first and second common areas, based on the similarity calculated in the calculating; and combining the first image and the second image such that the pair of lines selected in the selecting are combined, wherein:

the plurality of first lines set in the first common area and the plurality of second lines set in the second common area are straight lines which extend parallel to each other in a direction perpendicular to a direction in which the first and second images are to be combined, all of the lines set in the first and second common areas having a same predetermined shape and area, and the plurality of first lines are set side by side in the first common area at a fixed distance apart from one another, and the plurality of second lines are set side by side in the second common area at a fixed distance apart from one another.

10. A non-transitory computer-readable storage medium having a program stored thereon which is readable by a computer that controls an image processing apparatus having an acquiring unit that acquires a plurality of images which have been captured continuously, the program being executable to control the computer to function as units comprising:

a common area setting unit that sets a first common area in a first image from among the plurality of images acquired by the acquiring unit, and sets a second common area in a second image from among the plurality of images acquired by the acquiring unit, wherein the first and second common areas include imaging contents common to both of the first and second images;

a line setting unit that sets a plurality of first lines in the first common area and sets a plurality of second lines in the second common area, the lines being set in the first and second areas regardless of imaging contents of the first and second common areas;

a calculation unit that calculates a similarity by comparing (i) one of the plurality of first lines set in the first common area and (ii) one of the plurality of second lines set in the second common area that corresponds to the one of the plurality of first lines, for each of the plurality of first lines set in the first common area;

a selection unit that selects a pair of lines from among the lines set in the first and second common areas by the line setting unit, based on the similarity calculated by the calculation unit; and a composite unit that combines the first image and the second image such that the pair of lines selected by the selection unit are combined, wherein:

the plurality of first lines set in the first common area and the plurality of second lines set in the second common area are straight lines which extend parallel to each other in a direction perpendicular to a direction in which the first and second images are to be combined, all of the lines set in the first and second common areas having a same predetermined shape and area, and
the plurality of first lines are set side by side in the first common area at a fixed distance apart from one another, and the plurality of second lines are set side by side in the second common area at a fixed distance apart from one another.

* * * * *